UNITED STATES PATENT OFFICE.

J. C. G. HOWITZ, OF COPENHAGEN, DENMARK.

IMPROVED COMPOSITION FOR PURIFYING GAS.

Specification forming part of Letters Patent No. 37,815, dated March 3, 1863.

*To all whom it may concern:*

Be it known that I, J. C. G. HOWITZ, of Copenhagen, in the Kingdom of Denmark, have invented a new and Improved Process of Purifying Coal-Gas; and I do hereby declare that the following is a full, clear, and exact description of the same.

This invention consists in the employment or use for purifying coal-gas of iron ore mixed with spent tan or sawdust, in about the proportion hereinafter specified, in such a manner that the sulphur or combinations of sulphur and the carbonic oxide and carbonic acid and other impurities contained in said gas are completely absorbed and the oxide of iron transformed into sulphuret of iron, cyanide of iron, carburets of iron, &c.

To enable those skilled in the art to fully understand and use my invention, I will proceed to describe it.

The iron ore, which is a natural oxide of iron, is ground to powder, which need not be very fine. It is then mixed with spent tan or sawdust in such a proportion that two hundred cubic feet of tan or sawdust are mixed with one thousand pounds of ore. When well mixed, the mass is slightly moistened with water and placed on the trays of the purifiers. The purifiers are similar in construction to the ordinary lime purifiers; but the trays are made of wood and the layers are put on to the thickness of at least fifteen inches. The oxide of iron absorbs the sulphur from the sulphureted hydrogen, sulphuret of ammonium, &c., in the gas, and forms sulphuret of iron. It also absorbs carbonic oxide, carbonic acid, and combinations of cyanogen which may be contained in the gas, and, particularly in respect to the sulphur and its combinations, the iron ore acts quite as well or better than lime. After the ore has lost its purifying property it is removed from the purifier and laid in a heap about three or four feet high on a water-tight bottom, which is slightly inclined toward a gutter or trough. In this state a quantity of liquid ammonia or gas-water is poured over the ore, and in filtering through the same the ammonia loses its smell of sulphureted-hydrogen gas and absorbs the impurities contained in the iron ore. The ammonia is transformed principally into sulphate cyanate and sesquicarbonate, which result depends in a great measure upon the quick oxidation of the sulphuret of iron, &c., by the oxygen of the atmospheric air, so as to form sulphate of oxide of iron, &c. The acid from this salt is then absorbed by the ammonia. The purifying material is then washed out with pure water, and after having been exposed to the atmospheric air for a few days it is quite revivified, and it can now be used again in the same manner as above specified.

What I claim as new, and desire to secure by Letters Patent, is—

The employment or use of the within-described composition of iron ore and spent tan or sawdust, mixed together in about the proportion herein specified, for the purpose of purifying coal-gas, substantially in the manner set forth.

Copenhagen, the 4th of October, 1862.

J. C. G. HOWITZ.

Witnesses:
CHARLES HECKSLY.
I. P. HOCHLAND.